United States Patent
Barnes et al.

(10) Patent No.: US 11,059,240 B2
(45) Date of Patent: Jul. 13, 2021

(54) METHOD OF DESIGNING A PLYBOOK FOR A COMPOSITE COMPONENT

(71) Applicant: ROLLS-ROYCE PLC, London (GB)

(72) Inventors: Ashley Barnes, Derby (GB); Darren Ivor James, Derby (GB)

(73) Assignee: ROLLS-ROYCE PLC, London (GB)

( * ) Notice: Subject to any disclaimer, the term of this patent is extended or adjusted under 35 U.S.C. 154(b) by 444 days.

(21) Appl. No.: 15/768,402

(22) PCT Filed: Oct. 13, 2016

(86) PCT No.: PCT/GB2016/053170
§ 371 (c)(1),
(2) Date: Apr. 13, 2018

(87) PCT Pub. No.: WO2017/064489
PCT Pub. Date: Apr. 20, 2017

(65) Prior Publication Data
US 2018/0304557 A1    Oct. 25, 2018

(30) Foreign Application Priority Data
Oct. 15, 2015   (GB) ...................................... 1518285

(51) Int. Cl.
*B29C 70/38*    (2006.01)
*G05B 19/4097*    (2006.01)
(Continued)

(52) U.S. Cl.
CPC ........ *B29C 70/386* (2013.01); *B29C 33/3807* (2013.01); *B29C 70/38* (2013.01);
(Continued)

(58) Field of Classification Search
CPC ... B29C 70/386; B29C 33/3807; B29C 70/38; B29C 70/541; G05B 19/4097; G05B 2219/45238
See application file for complete search history.

(56) References Cited

U.S. PATENT DOCUMENTS

| | | | |
|---|---|---|---|
| 2010/0204815 A1* | 8/2010 | Murrish | G05B 19/4097 700/98 |
| 2012/0109594 A1* | 5/2012 | Grape | G06F 30/15 703/1 |

(Continued)

FOREIGN PATENT DOCUMENTS

| | | |
|---|---|---|
| EP | 1050396 A1 | 11/2000 |
| JP | 2008-217251 A | 9/2008 |

(Continued)

OTHER PUBLICATIONS

Wucher B, Lani F, Pardoen T, Bailly C, Martiny P. Tooling geometry optimization for compensation of cure-induced distortions of a curved carbon/epoxy C-spar. Composites Part A: Applied Science and Manufacturing. Jan. 1, 2014;56:27-35. (Year: 2014).*

(Continued)

*Primary Examiner* — Chuen-Meei Gan
(74) *Attorney, Agent, or Firm* — Banner & Witcoff, Ltd.

(57) ABSTRACT

Methods of designing a plybook for a composite component are disclosed. Included method comprising: defining a component volume corresponding to the composite component to be manufactured; defining a plurality of successive plies of composite material to fill the component volume; simulating at least some of the plurality of successive plies of composite material based on an estimate of variable cured ply thickness, wherein the variable cured ply thickness is estimated by: simulating at least a portion of a respective ply of composite material; and estimating a cured ply thickness for the portion of composite material at least partly based on (Continued)

local conditions of the portion. A plybook is defined based on the plurality of simulated plies.

19 Claims, 9 Drawing Sheets

(51) Int. Cl.
  *B29C 33/38*     (2006.01)
  *B29C 70/54*     (2006.01)
(52) U.S. Cl.
  CPC ........ *B29C 70/541* (2013.01); *G05B 19/4097* (2013.01); *G05B 2219/45238* (2013.01)

(56) References Cited

U.S. PATENT DOCUMENTS

2013/0103359 A1* 4/2013 Grandine ................ G06F 30/15
                                                          703/1
2015/0106062 A1* 4/2015 Chen-Keat .............. B29C 70/30
                                                          703/1

FOREIGN PATENT DOCUMENTS

| WO | 2012061346 | A2 | | 5/2012 | |
| WO | 2015057391 | A1 | | 4/2015 | |
| WO | WO-2015057391 | A1 | * | 4/2015 | ........... B29C 70/345 |

OTHER PUBLICATIONS

Kappel, Erik, Daniel Stefaniak, Tom Spröwitz, and Christian Hühne. "A semi-analytical simulation strategy and its application to warpage of autoclave-processed CFRP parts." Composites Part A: Applied Science and Manufacturing 42, No. 12 (2011): 1985-1994. (Year: 2011).*

Telford, R., K. B. Katnam, and T. M. Young. "The effect of moisture ingress on through-thickness residual stresses in unsymmetric composite laminates: a combined experimental-numerical analysis." Composite Structures 107 (2014): 502-511. (Year: 2014).*

Jan. 13, 2017—(WO) International Search Report and Written Opinion—App. No. PCT/GB2016/053170—10 pages.

Apr. 28, 2016—(GB) Search Report—App. No. GB1518285.0—3 pages.

Bapanapalli et al., A linear finite element model to predict processing-induced distortion in FRP laminates, Composites Part A: Applied Science and Manufacturing, vol. 36, No. 12, Dec. 2005, pp. 1666-1674.

Radford, Donald W., "Cure Shrinkage Induced Warpage in Flat Uni-Axial Composites," Journal of Composites Technology and Research, vol. 15, No. 4, Winter 1993, pp. 290-296.

Teplinsky et al., "Computer simulation of process induced stress and strain development during cure of thick-section thermosetting composites," Computational Materials Science, vol. 6, No. 1, Jul. 1996, pp. 71-76.

Dec. 2, 2019—(CN) Office Action—App 3026800602906 (with translation).

Aug. 18, 2020—(JP) Office Action—App 2018-519766 (trans).

* cited by examiner

METHOD OF DESIGNING A PLYBOOK FOR A COMPOSITE COMPONENT

CROSS REFERENCE TO RELATED APPLICATIONS

This application is a National Stage Application under 35 U.S.C. § 371 of co-pending PCT application number PCT/GB2016/053170, filed 13 Oct. 2016; which claims priority to GB1518285.0, filed 15 Oct. 2015, all of which are hereby incorporated by reference in their entireties for any and all non-limiting purposes.

The invention relates to a method of designing a plybook for a composite component.

Composite materials are increasingly used for components that require particular combinations of material properties. In particular, composite materials such as Carbon Fibre Reinforced Polymer (CFRP) are commonly used for components in the aerospace and other industries due to their high stiffness and low weight. Composite materials typically comprise a reinforcement material (such as carbon fibre) and a matrix material (such as epoxy resin).

There are several known methods for automatically laying up composite material for a component, including Automatic Fibre Placement (AFP) and Automatic Tape Laying (ATL). In AFP, several individual fibres of composite material are gathered to form a tow, and the tow is laid over a tool and periodically cut to form a course of composite material. A narrow width of tape could be used instead of individual fibres or tows. In ATL, a wider tape is applied directly to the tool over a course.

In both AFP and ATL, composite material is typically applied to a tool using an automatic tool, known as an applicator head. The applicator head applies courses of tows or tape to the tool according to a pre-determined pattern to form each ply. The pre-determined pattern can be defined manually, semi-automatically or automatically. For example, a pattern of tow courses may be defined automatically by a steering program running on a computer which receives an input in the form of a plybook datafile, and generates a head path datafile for the applicator head. The plybook datafile typically comprises the definitions for a plurality of successive plies and their respective ply shapes for forming a composite component (or a pre-form for the component). The head path datafile typically comprises definitions for the steering path for the applicator head, together with cut locations and optionally speed definitions for the various sections of the steering path, for laying up the plies defined in the plybook datafile.

The applicant has previously designed the plybook (i.e. the definition of a plurality of successive plies of composite material and their respective ply shapes) by an automatic process by which a volume corresponding to the component to be manufactured is defined, and the plies are simulated as applied in the volume using manufacturer data for ply thickness.

However, the applicant has found that components manufactured according to plybooks designed in this way are typically larger or smaller than the simulated volume (i.e. the design volume) of the component. Accordingly, it is typically necessary to undertake thickness-related non-conformance activities, such as machining, after the curing process. Such non-conformance activities are typically manual, unreliable, and expensive. For example, some machining non-conformance activities may typically require the addition of sacrificial plies to be added into the component during manufacture, for the purpose of subsequently machining away non-conformant excess material. Sacrificial plies may be of adhesive material, rather than structural fibre reinforcement material, and thereby easier to machine.

It is therefore desirable to provide an improved method of designing a plybook for a composite component.

According to a first aspect of the invention, there is provided a method of designing a plybook for a composite component, comprising: defining a component volume corresponding to the composite component to be manufactured; defining a plurality of successive plies of composite material to fill the component volume; simulating at least some of the plurality of successive plies of composite material based on an estimate of variable cured ply thickness, wherein the variable cured ply thickness is estimated by: simulating at least a portion of a respective ply of composite material; and estimating a cured ply thickness for the portion of composite material at least partly based on local conditions of the portion; and defining a plybook based on the plurality of simulated plies.

The component volume relates to the three-dimensional shape of the component, for instance, as defined in a computer. The term component volume can be used interchangeably with "component shape" or "simulated component". The same applies to similar defined volumes in the following description, including the error volume and error compensation volume. For the avoidance of doubt, the term volume is not used herein to refer to the displacement volume, i.e. a scalar measurement of the amount of space which an object component.

The plybook may be defined so as to correspond to the plurality of successive plies as simulated in the component volume, based on the estimate of variable cured ply thickness.

The plybook comprises the definition of the plies to be laid up.

The plurality of plies may be defined so that the simulated plies fill the component volume. In other words, the volume occupied by the simulated plies may correspond to the component volume or may be coterminous with the component volume. Each ply may in turn be defined and simulated as applied in the component volume until the component volume is filled.

The steps of defining and simulating each ply may be conducted sequentially for each respective ply, such that a second ply of the plurality of successive plies is defined at least partly based on a simulated first ply of the plurality.

The component volume may comprise a start surface (or layup surface) and a target surface, and the plurality of plies may be defined to fill the component volume successively from the start surface to the target surface. Defining each ply of the plurality of successive plies may comprise: defining a reference surface for the ply based on an underlying surface; projecting the reference surface onto the target surface to define an intersect boundary; and defining a ply boundary for the ply based on the intersect boundary.

The reference surface may be projected onto the target surface along a general layup axis extending from the start surface to the target surface (and along a direction from the start surface to the target surface). The intersect boundary may be projected onto the reference surface for the ply or a corresponding surface of the simulated ply to define the ply boundary.

The plurality of successive plies of composite material may be a first plurality of successive plies defined to fill the component volume based on a first estimate of cured ply thickness. The estimate of variable cured ply thickness may be a second estimate of cured ply thickness. At least some of the first plurality of successive plies of composite material may be simulated based on the second estimate of cured ply thickness to define an error volume. The method may further comprise: defining an error compensation volume based on the error volume and the component volume; defining a second plurality of successive plies of composite material to fill the error compensation volume based on the first estimate of cured ply thickness; and defining a plybook based on the second plurality of simulated plies.

Accordingly, the plybook may be defined to correspond to the second plurality of successive plies as simulated in the error compensation volume. The plybook may also be defined based on the first plurality of successive plies, since the first plurality of successive plies are used to determine the error compensation volume.

In other words, there is provided a computer-implemented method of designing a plybook for a composite component, comprising: defining a component volume corresponding to the component to be manufactured; defining a first plurality of successive plies to fill the component volume, wherein at least some of the first plurality of plies are simulated as applied in the component volume based on a first estimate of cured ply thickness; simulating at least some of the first plurality of successive plies based on a variable second estimate of cured ply thickness to define an error volume, wherein the variable cured ply thickness is estimated by: simulating at least a portion of a respective ply of composite material; and estimating a cured ply thickness for the portion of composite material at least partly based on local conditions of the portion; defining an error compensation volume based on the error volume and the component volume; defining a second plurality of successive plies of composite material to fill the error compensation volume based on the first estimate of cured ply thickness; and defining a plybook based on the second plurality of simulated plies.

The first estimate of cured ply thickness may be an estimate of constant cured ply thickness, which may be applied across the ply (i.e. across the full extent of the ply).

Defining the error compensation volume may comprise determining a thickness error by comparing the error volume and the component volume, and modifying the component volume based on the thickness error. Accordingly, the error compensation volume may compensate for the thickness error. Accordingly, the second plybook defined based on the second plurality of successive plies, and/or a component manufactured according to the plybook, may compensate for the thickness error.

The variable cured ply thickness may be estimated recursively. In other words, the variable cured ply thickness may be estimated for each portion of a set of portions of composite material. The set of portions may form a subset of the simulated plies of composite material, for example, the set of portions may correspond to those portions of the simulated plies which are subject to local conditions that may affect the cured ply thickness, or for those portions of the respective volume having a relatively large number of plies.

Estimating the cured ply thickness for a portion of a ply of composite material may be at least partly based on one or more local conditions of the portion selected from the group consisting of:
 the position of the portion within the component volume;
 the position of the portion within the respective ply;
 the curvature of the portion as applied in the component volume; and
 the free volume local to the portion in the simulated component volume determined by simulating the presence of gaps and/or overlaps between tows and/or courses of composite material.

Estimating the cured ply thickness for a portion of a ply of composite material may comprise: determining the position of the portion within the component volume; and estimating the cured ply thickness for the portion as a function of the proximity of the portion to a boundary of the component volume.

Estimating the cured ply thickness for the portion as a function of the proximity of the portion to a boundary of the component volume may comprise referring to a predetermined boundary proximity relationship at least partly based on the proximity of the portion to a boundary of the component volume. The predetermined boundary proximity relationship may be at least partly based on other local conditions, such as the composition of the composite material.

Estimating the cured ply thickness for a portion of a ply of composite material may comprise: determining the position of the portion within the respective ply; and estimating the cured ply thickness for the portion as a function of the proximity of the portion to an edge of the ply.

Estimating the cured ply thickness for the portion as a function of the proximity of the portion to an edge of the ply may comprise referring to a predetermined edge proximity relationship at least partly based on the proximity of the portion to a boundary of the component volume. The predetermined boundary proximity relationship may be at least partly based on other local and/or global conditions, such as the composition of the composite material.

Estimating the cured ply thickness for the portion as a function of the proximity of the portion to a boundary of the component volume and/or an edge of the respective ply may comprise simulating resin bleed effects during the manufacturing process.

Estimating the cured ply thickness for a portion of a ply of composite material may comprise determining a metric of curvature associated with the portion; estimating the cured ply thickness for the portion as a function of the curvature.

Determining the metric of curvature associated with the portion may comprise evaluating the curvature the portion of the simulated ply, or the curvature of an associated surface, such as the surface of a preceding ply, reference surface or the curvature of a lay-up surface of the component volume (i.e. a surface upon which the first ply in the plybook is laid). Determining the metric of curvature associated with the portion may comprise evaluating the magnitude of curvature, for example, the magnitude of curvature about one or more principal axes of the portion. Determining the metric of curvature may comprise evaluating the type of curvature, for example, by evaluating whether the portion has Gaussian curvature.

Estimating the cured ply thickness for the portion as a function of the metric of curvature may comprise referring to a predetermined curvature relationship at least partly based on the curvature associated with the portion. The predetermined curvature relationship may be at least partly based on other local and/or global conditions, such as the composition of the composite material.

Estimating the cured ply thickness for a portion of a ply of composite material may comprise: determining a metric of free volume local to the portion in the simulated component volume by determining the presence of gaps and/or overlaps between tows and/or courses of composite material; estimating the cured ply thickness based on the metric of free volume.

Estimating the cured ply thickness for the portion as a function of the metric of free volume may comprise referring to a predetermined free volume relationship at least partly based on the metric of free volume local to the portion. The predetermined free volume relationship may be at least partly based on other local and/or global conditions, such as the composition of the composite material.

The method may further comprise determining at least part of a head path for laying-up the simulated plies, and the presence of gaps and/or overlaps between tows and/or courses of composite material may be determined based on simulating tows and/or courses as applied in the component volume according to the head path.

The presence of gaps and/or overlaps between tows and/or courses of composite material may be determined by analysing the proximity between tows and/or courses as applied in the component volume according to the head path.

The plurality of successive plies of composite material may be simulated using a discretized mesh. The discretized mesh may be progressively grown in layers as each ply of composite material is simulated. A separate discretized mesh may be defined for each simulated ply.

According to a second aspect of the invention there is provided a method of laying up a pre-form for a composite component, comprising: defining a plybook for the composite component in accordance with the first aspect of the invention; and controlling composite layup equipment to layup each ply defined in the plybook to form the pre-form.

The method may be computer-implemented.

According to a third aspect there is provided a computer-readable medium carrying instructions for carrying out a method in accordance with the first aspect of the invention.

According to a fourth aspect of the invention, there is provided a non-transitory computer-readable storage medium comprising computer-readable instructions that, when read by a computer, cause the performance of a method in accordance with the first or second aspects of the invention.

According to a fifth aspect of the invention, there is provided a signal comprising computer-readable instructions that, when read by a computer, cause performance of a method in accordance with the first or second aspects of the invention.

According to a seventh aspect of the invention, there is provided a computer program that, when ready by a computer, causes performance of a method in accordance with the first or second aspect of the invention.

According to an eighth aspect of the invention, there is provided an apparatus comprising: at least one processor; and at least one memory comprising computer-readable instructions; the at least one processor being configured to read the computer-readable instructions and cause performance of a method in accordance with the first or second aspects of the invention.

The invention will now be described, by way of example, with reference to the following figures, in which.

In order to put the invention into context, example design and manufacturing methods for a composite component as previously considered by the applicant (but not disclosed) will first be described with reference to FIGS. 1-5, as follows.

Figure 1:
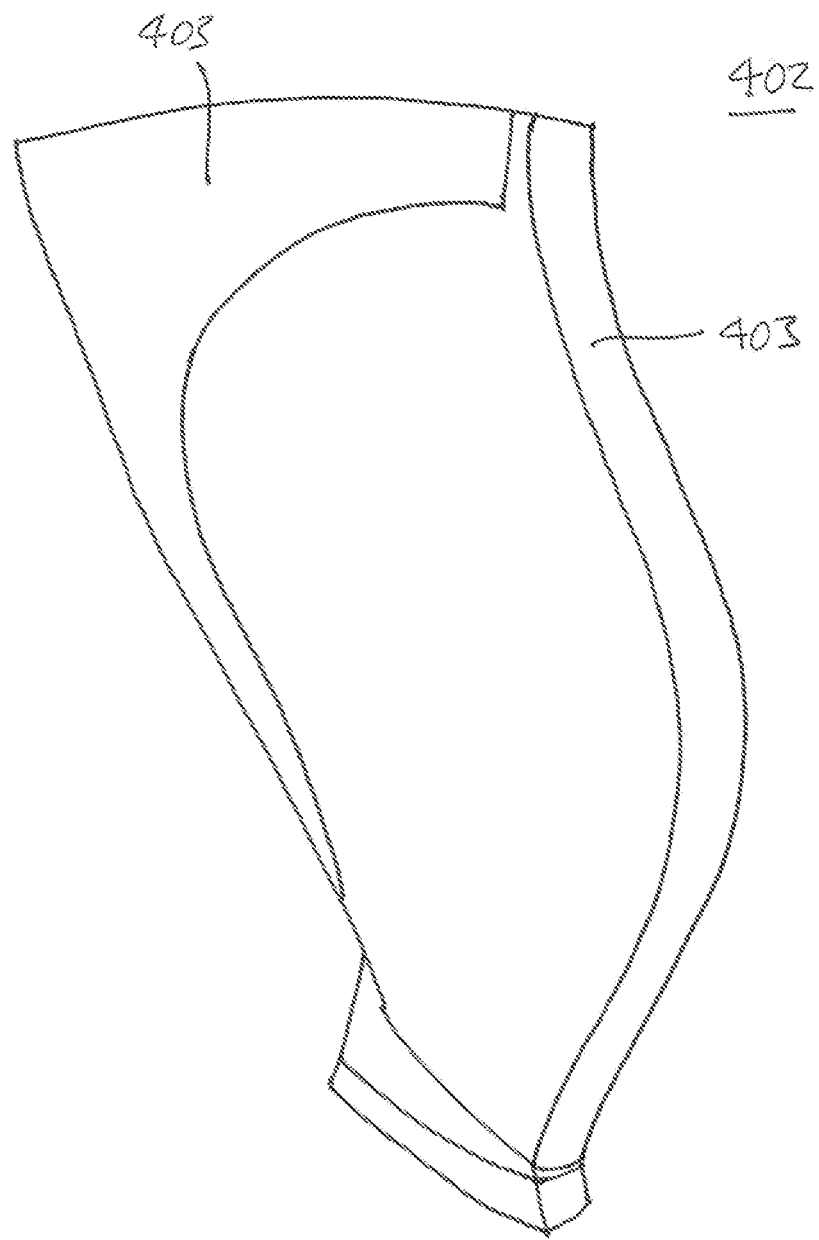
FIG. 1 shows a perspective view of a component volume corresponding to a composite component.

FIG. 1 shows a composite component, in particular, a three-dimensional representation of a composite fan blade body 402, referred to herein as a component volume 12, as simulated in a computer. The fan blade body 402 includes recessed portions 403 for the attachment of leading edge, trailing edge and tip metalwork.

Figure 2:
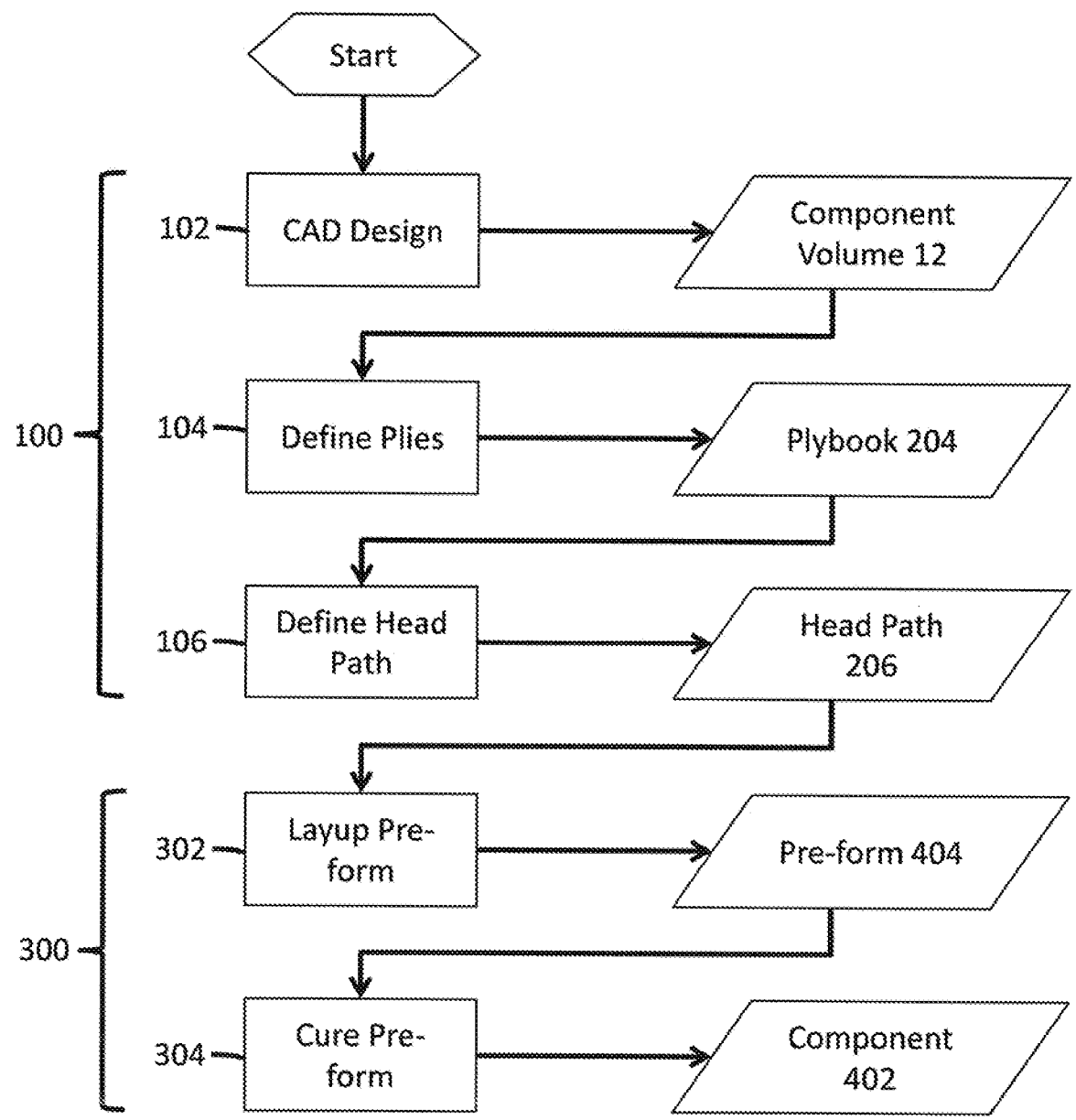
FIG. 2 shows methods for designing a plybook and manufacturing a composite component.

FIG. 2 shows an example method of defining a layup procedure for the component (100) and an example method of manufacturing the component (300). The method of defining the layup procedure (100) comprises sub-methods including designing a CAD model of the component (102) and outputting the corresponding component volume 12 to a resource; defining plies of the component based on the component volume (104) and outputting a corresponding plybook 204 to a resource; defining a head path (106) and outputting the corresponding head path data 206 to a resource.

The subsequent method of manufacture (300) comprises operating layup equipment based on the head path data 206 (302) to manufacture a pre-form 404 for the composite component 402, and curing the pre-form 404 (304) to form the completed component 402.

The component volume 12 can be generated according to any suitable CAD design method 102 as are known in the art.

Figure 3:
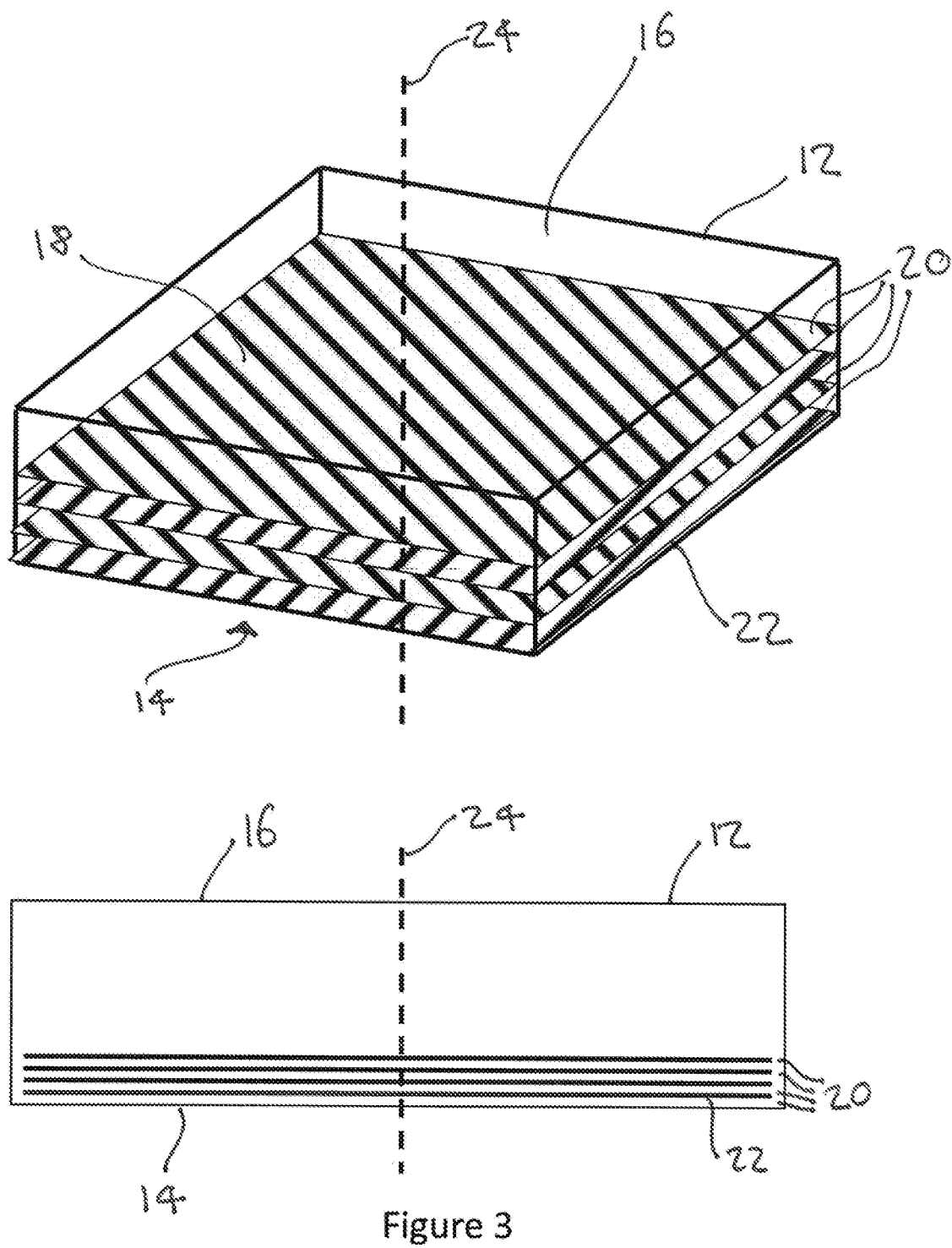
FIG. 3 shows a simplified perspective view and side views of a component volume simulation.
Figure 4:
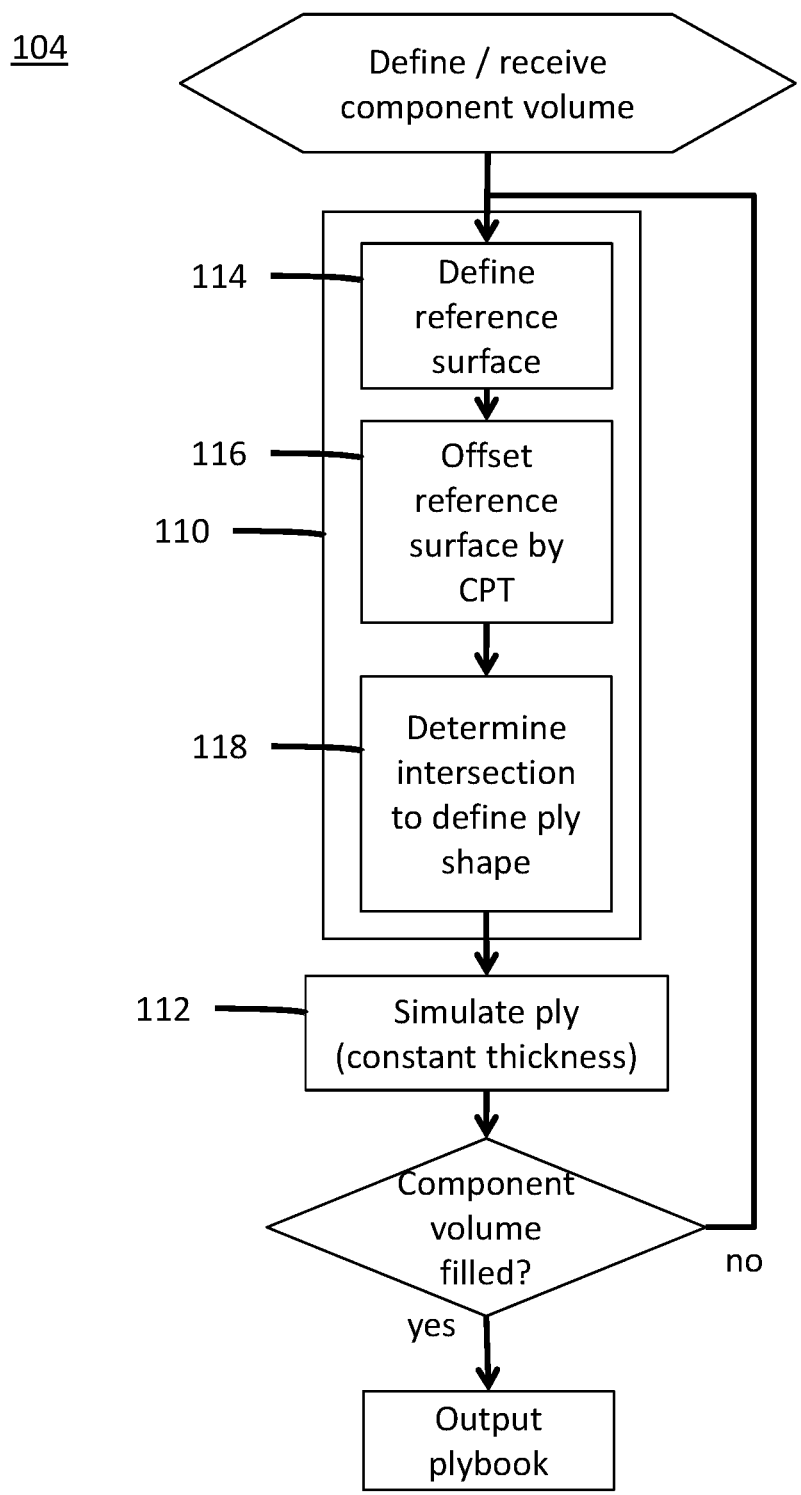
FIG. 4 shows a method of designing a plybook.
Figure 5:
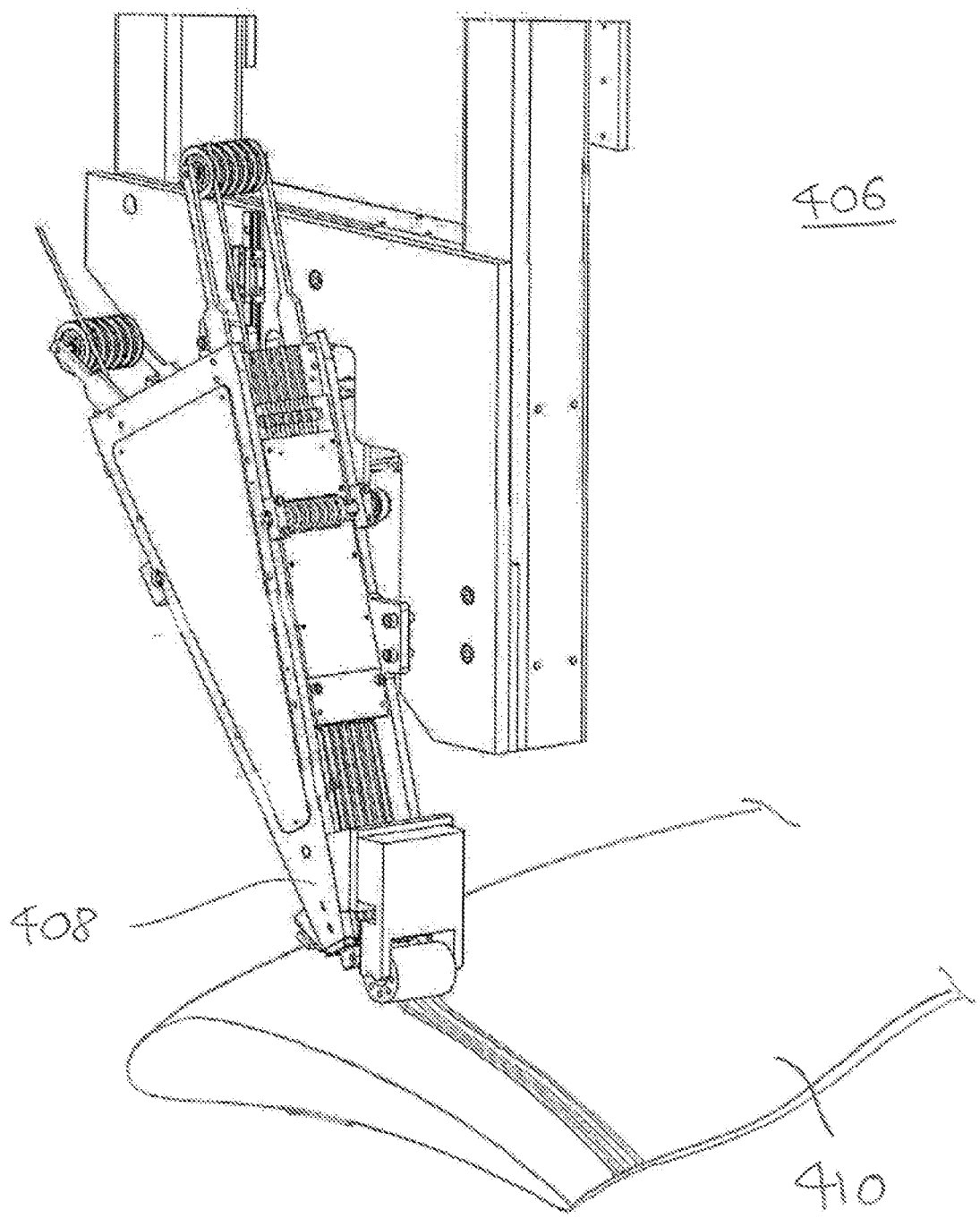
FIG. 5 shows layup equipment.

FIG. 3 shows a simplified component volume 12, and FIG. 4 shows an example ply definition method (104) for defining the ply shapes and simulating the plies 20 in the component volume.

As shown in FIGS. 3 and 4, in the example ply definition method (104), a plurality of successive plies 20 are defined in the component volume 12, starting with a base ply 22 disposed on a layup surface 14 of the component volume 12. The layup surface 14 is selected from a plurality of boundary walls that delimit the component volume 12, and has an opposing target surface 16 situated on the opposite side of the component volume 12. In the embodiment shown in FIG. 3, the target surface 16 includes the side surfaces of the volume 12.

In this example, each ply 20 is defined (104) by determining a ply shape for the ply 20 (110), based on the component volume 12, and subsequently simulating the ply 20 as applied in the component volume 12 (112).

In this example, the ply shape is determined by first determining a reference surface 18 (114) based on the surface to which the ply will be applied (i.e. the top-most surface in the direction from the layup surface 14 to the target surface). For the base ply 22, the reference surface 18 is thereby determined based on the layup surface 14, whereas for subsequent plies 20, the reference surface is determined based on the "upper" or "exposed" surface of the preceding ply plies 20. The reference surface 18 is essentially a simulated copy of the corresponding surface.

The reference surface 18 is then offset by the predetermined cured ply thickness (116) along a general layup axis 24, which in this example is defined as an axis of the component volume 12 extending between the layup surface 14 and the target surface 16, so that the projected reference surface intersects the target surface 16 (including the side walls of the component volume) to define an intersection boundary. The ply shape is then determined based on the intersection (118), and the ply is simulated as applied in the component volume (112)

Accordingly, the ply shape for each ply is defined based on the target surface 16 so that, over successive plies, the stack of plies builds up within the component volume to correspond to the shape and curvature of the target surface.

In an alternative example, each ply 20 may first be simulated as applied in the component volume (112), and the respective ply shape may subsequently be determined (110) and the boundary 28 of the simulated ply modified accordingly.

It will be appreciated that the ply boundary 28 for each ply 20 may be defined according to other methods.

The base ply 22 (and each successive ply 20 in turn) is simulated as applied (112) in the component volume 12 as a continuous layer having a constant cured ply thickness (CPT) and terminating at the prescribed ply boundary for the respective ply. The CPT represents the thickness of the ply after curing, and in practice is typically a fraction of the as-laid thickness of each ply owing to a number of factors including the ratio of fibre reinforcement material, matrix material (e.g. epoxy resin) and gas inclusions and surface roughness. The CPT is set according to supplier data (i.e. the supplier of the composite material), or empirical values determined by the manufacturer. Accordingly, by simulating the plies 20 based on the CPT (as opposed to the thickness as-laid), the simulation represents the cured component 402, rather than a pre-form for the component.

In order to define the next ply 20, a new reference surface 18 is determined based on the uppermost surfaces of the simulated plies 20, and the further ply 20 is defined according to the above-described method.

Once sufficient plies 20 have been defined so that the final ply 20 fills the component volume 12 (and corresponds to the target surface 16), the plybook 204 is generated including the ply definitions (i.e. the relative locations and shapes of the plies). The plybook may be generated progressively.

It will be appreciated that the above-described example ply definition method (104) is one of several previously considered methods which could be used to define the plies and generate the plybook 204.

The head path is then defined based on the plybook 204 as is known in the art (104). Determining the head path (106) includes determining the courses of fibre composite material to be laid in order to form the respective plies 20 defined in the plybook 204 (i.e. the positions and extent of the courses). This process may be manual, semi-automatic or automatic, and may be done using the same resources as the method of defining the plies (104), or using different resources. For example, the plies may be defined on a first computer, and the head path may be defined using a separate computer, which may be integrated with or separate from layup equipment.

The head path is determined to provide (i.e. output) head path data 206, which in this example is a data file comprising instructions for layup equipment to cause relative movement between an applicator head 408 and a tool 410 so that courses of fibre composite material are laid up to form the plies 20 of the pre-form 404 for the component 402. For example, the head path data 206 may include a series of coordinates defining the head path (e.g. the position of the applicator head 408 relative the tool 410), and/or velocity and/or acceleration parameters that can be interpreted to result in movement, amongst other parameters.

In the manufacturing method (300), the head path data 206 is read by layup equipment 406 (FIG. 5), and the equipment controlled to cause relative movement along the corresponding head path so that the plies 20 of composite material are laid up in accordance with the plybook 204, thereby forming the pre-form 404 for the component 402 (302). The composite material is provided to the layup equipment 406 in the form of pre-impregnated ("pre-preg") tows of carbon fibre and epoxy resin.

The pre-form 404 is subsequently cured (304) under elevated temperature and pressure to form the component 402. In this example, the pre-form is relocated from the layup tool 410 to a mould (not shown) for the curing procedure (304).

The applicant has found that pre-forms and components manufactured according to the above-described method may deviate from their expected shapes. In the case of the pre-form, this may mean that the pre-form does not conform to a curing mould, and so non-conformance activities (e.g. de-bulking and machining) may be required in order to fit the pre-form into the mould. Similarly, the cured component 402 may deviate from the designed shape, which non-conformance may result in further corrective action, including machining which is typically laborious, inaccurate and expensive to conduct and verify.

Non-conformance issues are typically attributed to inherent inaccuracies of the ply definition and layup procedures, which are typically considered to result from the (at least partly) manual nature of these process. Accordingly, such non-conformance is typically addressed by modifying the cured component.

However, the applicant has found relationships between local conditions along the head path for a layup procedure and the cured ply thickness (CPT) of respective portions of the composite material once laid. The invention relates to a method of defining the plies taking into account these relationships, so as to mitigate non-conformance issues in the manufactured component 402.

Figure 6:
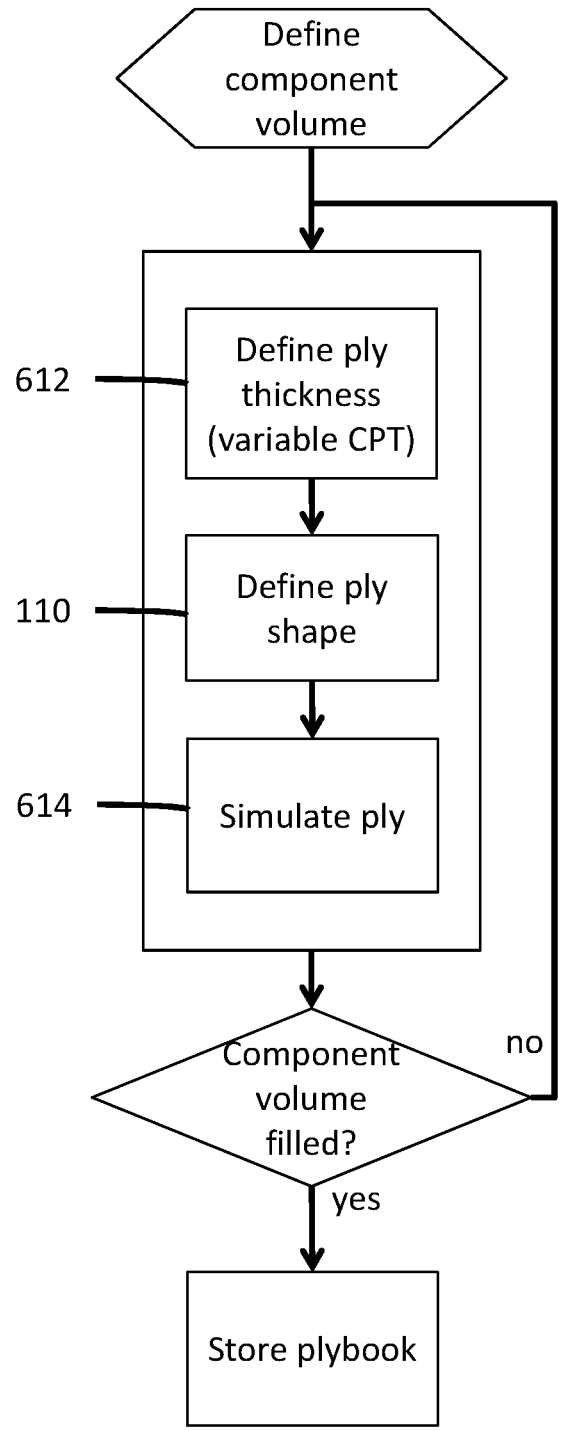
FIG. 6 shows a method of designing a plybook according to a first example embodiment of the invention.
Figure 7:
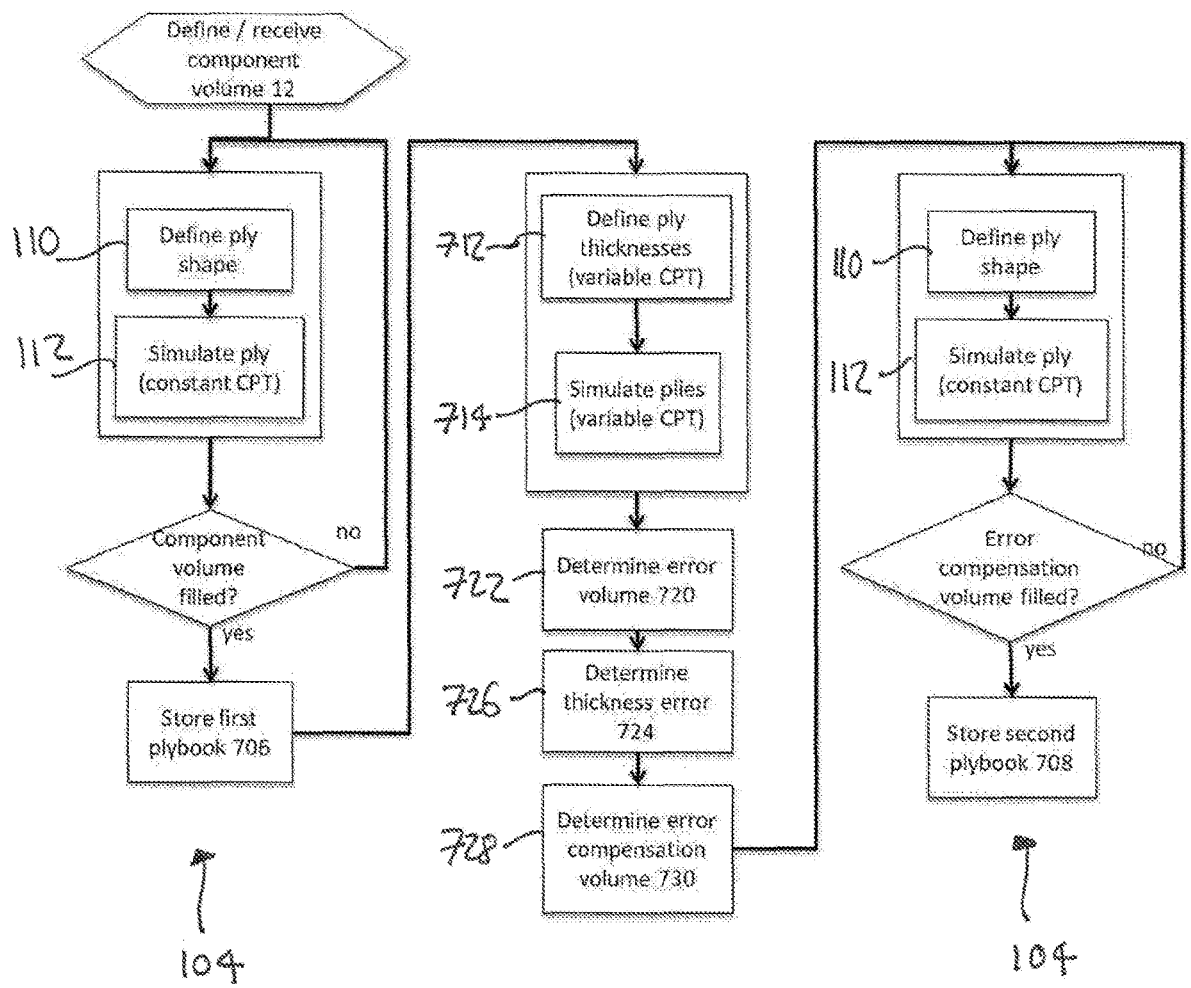
FIG. 7 shows a method of designing a plybook according to a second example embodiment of the invention.

As shown in FIGS. 6 and 7, example methods of defining a layup procedure according to the invention differs from the above-described example method (100) in that the methods include the simulation of plies 20 based on a variable cured ply thickness which is estimated at least partly based on local conditions.

Example methods of defining the plies (604, 704) according to the invention will now be described.

EXAMPLE 1

In a first example embodiment (604) shown in FIG. 6, each ply is determined by first defining a variable CPT (612) based on the reference surface 18, and the ply shape is subsequently determined (110) for each ply 20 as described above, albeit based on variable CPT. Each ply is then simulated as applied in the component volume 12 (614). In other embodiments, the ply shape may be first be estimated (110), and the variable CPT estimated subsequently (612).

The variable CPT is estimated as a variable quantity based on local conditions for respective portions of each ply (612), as set out in detail below.

In this example embodiment, the CPT for a portion of a ply 20 is estimated based on relationships between the CPT and each local condition from the group consisting of:

the position of the portion within the component volume 12;

the position of the portion within the respective ply 20;

the curvature of the portion and/or the reference surface 18 (or the underlying ply 20 or layup surface 14);

the free volume local to the portion determined based on simulating the presence of gaps and/or overlaps between tows and/or courses of composite material.

In other examples, the CPT may be estimated based on a subset or only one of the local conditions.

The applicant has found that the position of the respective portion within the component volume 12 and within the respective ply 20 has a relationship with CPT. In particular, during manufacture (300) of the component 402 (including curing (304)), matrix material (e.g. epoxy resin) from the pre-preg composite material is heated and becomes less viscous so that it moves within the pre-form 404 (as the pre-form is formed and during curing). The migration of the matrix material is particularly prominent where the respective portion is near a boundary of the respective ply (i.e. a lateral ply boundary, rather than planar faces of the ply), and when it is near a boundary of the component 402 as a whole. Further, there may be migration (e.g. shearing and/or spreading) of the fibre reinforcement material, and/or migration of matrix material out of the pre-form 404 or the component 402 at these locations. Through empirical analysis, the applicant has determined a number of relationships between CPT and the proximity of a portion of a ply to a boundary of the ply and/or its proximity to a boundary of the component. These relationships also depend on (at least) the nature of the composite material and the manufacturing conditions (e.g. temperature and pressure).

The applicant has also found that the local curvature of a ply portion has a relationship with its CPT, and has empirically determined a number of relationships between the curvature and the CPT accordingly. The applicant considers the relationship to arise owing to the presence of gaps and/or overlaps between adjacent tows and/or adjacent courses of tows that may result from ply curvature. It is desirable to minimise the presence of gaps and/or overlaps in a ply to ensure the component closely conforms to the specified design. However, gaps and/or overlaps may form where there is a high degree of local curvature and/or where the nature of the curvature precludes a fitted or "draped" ply. A fitted or draped ply is one that can be mapped directly onto the curved surface. For example, where the local curvature corresponds to a developable surface (i.e. a surface having zero Gaussian curvature), this may not cause gaps and/or overlaps to form. A developable surface is one that can be mapped to a planar surface without distortion. In contrast, a surface having non-zero Gaussian curvature may result in gaps and/or overlaps forming, as the ply may be required to distort around the curved local geometry (known as non-geodesic steering).

Accordingly, the applicant has determined relationships corresponding to both the degree and nature of the local curvature. The applicant has determined these relationships based on the curvature of the reference surface 18 local to the respective ply portion. However, it will be appreciated that any suitable indicator of local curvature may be used (such as the curvature of the underlying ply, or the local curvature of the component volume 12).

The above-described empirically-derived relationships between local curvature and CPT may be considered as indirect relationships between the CPT and the local free volume in the pre-form as a result of gaps and/or overlaps between adjacent tows and/or courses.

Further, the applicant has developed methods of determining a metric of the free volume local to a portion of composite material along the head path, which may be determined based on simulating (i.e. determining) the presence of gaps and/or overlaps between tows and/or courses of composite material. In particular, the free volume can be determined by defining an initial plybook and subsequently determining a corresponding head path (106) based on the initial plybook. The head path can then be analysed to determine where gaps and/or overlaps may occur, i.e. by simulating the tows and/or courses and determining where these may diverge and converge. Alternatively, an estimate of free volume can be determined based on local curvature alone, based on relationships determined through empirical tests. Thus, a metric of local free volume correlated to position along the head path (or within the component volume 12) can be determined and stored in a memory. The plybook can then be re-defined (604) based on the metric of local free volume. The head path and plybook can be redefined in an iterative process. Alternatively, the head path could be defined one ply at a time based on ply shape alone (i.e. before the variable CPT is estimated), in which case the CPT evaluation for each ply can be estimated based on a metric of free volume within the respective ply and any preceding plies.

In this embodiment, the CPT is estimated as a variable quantity across the breadth of each ply (i.e. over the entirety of each ply). In other embodiments, the CPT may only be estimated as a variable quantity over one or more discrete regions of the component volume 12, for example, regions where variable CPT effects are particularly important. The CPT may be assumed constant over other portions or regions of the ply, or may be estimated using a different model (e.g. using different local conditions). For example, variable CPT effects may have a greater impact at the root portion of a composite fan blade body 402, where there are significantly more layers of composite material than in an aerofoil portion of the body 402. Accordingly, in such embodiments the CPT may be estimated as a variable quantity over a portion of each ply corresponding to selected regions of a component volume.

Figure 8:
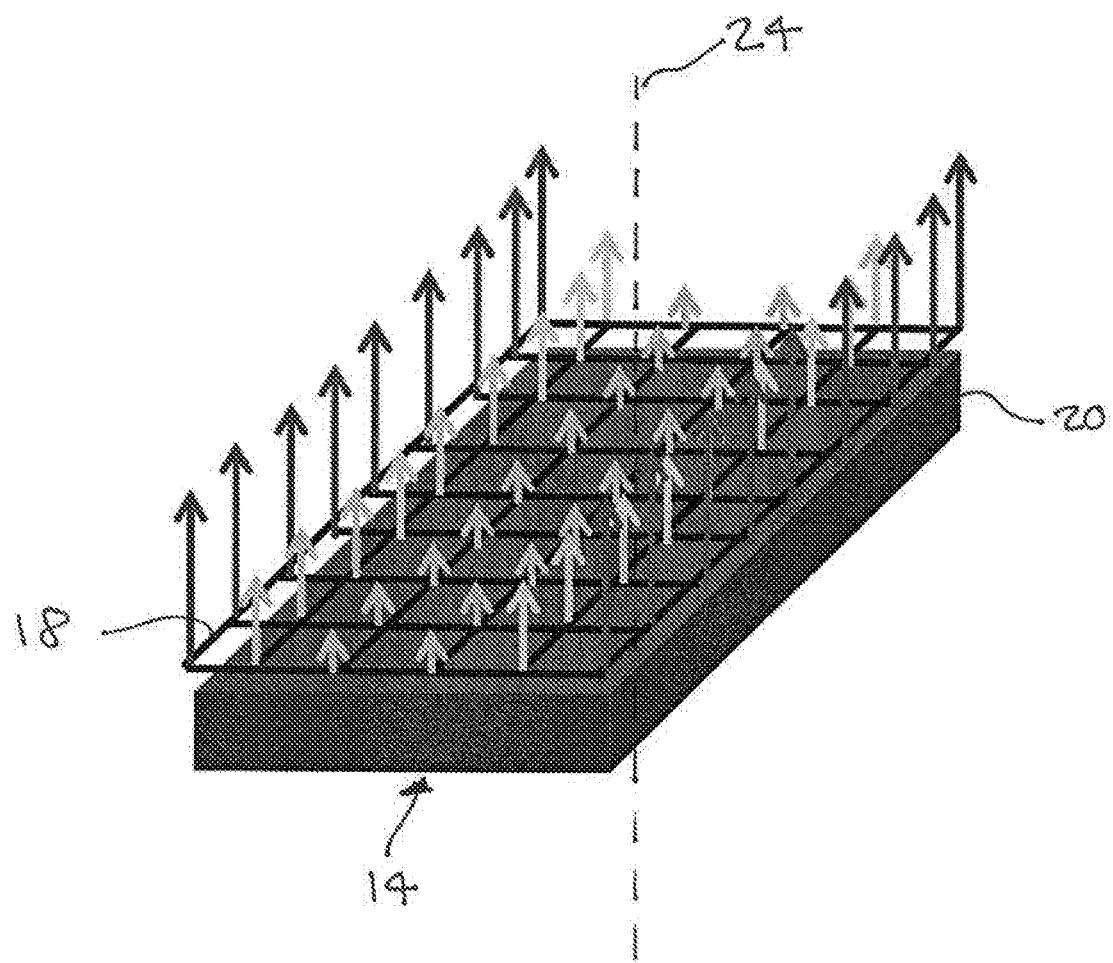
FIG. 8 shows a discretised approach for defining simulating plies of variable cured ply thickness.

The plies 20 are simulated as applied in the component volume according to a method (614) suitable for accommodating the variable CPT. In this example embodiment, the plies 20 are simulated using a discretized approach by which each reference surface 18 in turn is discretized into a 2D mesh, and the CPT is estimated based on the local conditions at each of the nodes of each mesh element (as shown in FIG. 8). Subsequently, the CPT of each respective ply 20 is simulated by growing the mesh along the general layup axis 24 by a variable distance corresponding to the estimated CPT for each mesh node, thereby forming a 3D mesh layer of volumetric cells. In this example embodiment, the mesh is modified as it is grown to correspond to the sidewalls of the component volume 12 (i.e. the walls extending between the boundaries of the layup surface 14 and the target surface 16). In this example embodiment, the mesh elements adjacent the sidewalls of the component volume 12 are grown along the sidewall, such that the mesh nodes adjacent the sidewalls are laterally displaced with respect to the underlying mesh node. Mesh smoothing procedures can be applied to adjust each mesh layer to avoid bunching of cells near the boundaries, as is known in the art.

The reference surface 18 for each ply 20 to be defined can therefore be defined as the surface of the underlying 3D mesh. By way of example, there may be at least 10,000 mesh cells in each layer.

In other embodiments, a new 2D mesh may be created for each reference surface 18 and corresponding ply 20. Consequently, the number and distribution of mesh nodes, faces and cells may differ from layer to layer. Such an approach may avoid bunching of cells at cell boundaries for complex geometries.

Once sufficient plies 20 are simulated to fill the component volume, the plybook 204 comprising the definition of the successive plies (i.e. at least the ply shapes and relative position) is output to a resource, which in this embodiment is a memory of a computer.

It will be appreciated that other methods of defining and offsetting the reference surface 18 to define the ply shapes and simulate each successive ply may be used. For example, it may be possible to define and offset the reference surface based on point cloud methods, or surface equations.

EXAMPLE 2

In a further example according to the invention and shown in FIG. 7 (704), use is made of the previously-considered ply definition method (104) which is based on a first estimate of constant CPT, and the component volume 12 is adjusted to compensate for error based on an improved second estimate of variable CPT, as described above.

In this example embodiment, a first component volume 12 corresponding to the component to be manufactured is defined as described above. A first version of a plybook 706 is defined (104) based on a constant CPT, substantially as described above. In particular, a plurality of successive plies of composite material 20 are defined and simulated as applied in the component volume 12 (110, 112) in turn until the component volume is determined to be filled. For each ply 20, the ply shape is defined as described above (110), the CPT is based on a first estimate of constant CPT, and the ply is simulated as applied in the component volume 12 (112). The first version of the plybook 706 is output to a resource, which in this embodiment is computer memory.

Subsequently, a second estimate of variable CPT is used to provide an improved estimate of CPT for each of the plies (712), and the plies 20 are simulated once more (714) to determine an error volume 720 (722) based on the cumulative thickness of the simulated plies 20 of the first plybook 706. According to the second estimate of variable CPT, the CPT of a portion of a ply varies in dependence on local conditions as described above with respect to the first example embodiment, including dependencies on or more local conditions selected form the group consisting of:
the position of the portion within the component volume;
the position of the portion within the respective ply;
the curvature of the portion and/or the reference surface 18 (or the underlying ply 20 or layup surface 14);
the free volume local to the portion determined based on simulating the presence of gaps and/or overlaps between tows and/or courses of composite material.

The error volume 720 therefore represents a simulated version of the component 402 that would be manufactured according to the first version of the plybook 406.

Subsequently, the error volume 720 is compared with the component volume 12 to determine a thickness error 724 (726) relating to the difference in thickness between the component volume 12 and the error volume 720. In this example embodiment, the thickness error 724 is determined based on comparing the target surface 16 of the component volume and the corresponding surface of the error volume 720 to determine an offset or error vector along the general layup axis 24 at a plurality of points across the target surface 16, thereby forming a matrix of error vectors representing the error across the target surface.

The thickness error 724 is then applied to the target surface 16 of the component volume 12 in order to define an error compensation volume 730 (728) in which the error is mirrored (710). For example, if the thickness error 724 were found to be generally positive, so that the error volume 720 is generally extends beyond (i.e. is larger) than the component volume 12, the thickness error vectors would be deducted from the target surface 16 of the component volume 12 so that the error compensation volume 730 is correspondingly smaller than the error compensation volume 12.

Accordingly, the error compensation volume 730 does not directly correspond to the component 402 to be manufactured.

A second version of the plybook 708 is then defined using the above-described ply definition method (104), by simulating a plurality of successive plies 20 of composite material as applied in the second component volume 13, again based on the first estimate of constant CPT.

Accordingly, the second version of the plybook 708 is defined based on a constant estimate of CPT and an error compensation volume 730 which does not directly correspond to the shape of the component to be manufactured. Nevertheless, since the error compensation volume 730 is defined based on a second estimate of variable CPT, and in particular is defined so as to mirror the error that would result using the first estimate of constant CPT to manufacture the component 402, the applicant has found that the second version of the plybook 708 results in a cured component 402 closely corresponding to the component as designed.

In this second example embodiment, the pre-form 404 for the component is then laid up (302) and cured (304) based on the second version of the plybook 708 in the same manner as described above with respect to the first example embodiment.

A particular advantage of the second example embodiment of the invention is that existing computer-implemented procedures for designing a plybook based on constant CPT can be used to define the plybook, and the plybook is based on a variable estimate of CPT by virtue of defining the volume for these procedures appropriately (i.e. by mirroring the thickness error in the error compensation volume).

In other embodiments, the first estimate of CPT may be non-constant, but may be an initial or coarse estimate of CPT, whereas the second estimate of variable CPT is a more accurate or refined estimate.

In the foregoing description, steps of a method have been identified using reference numerals in parentheses, whereas physical and simulated articles, such as the component 10 and the component volume 12, have been identified using reference numerals without parentheses.

Figure 9:
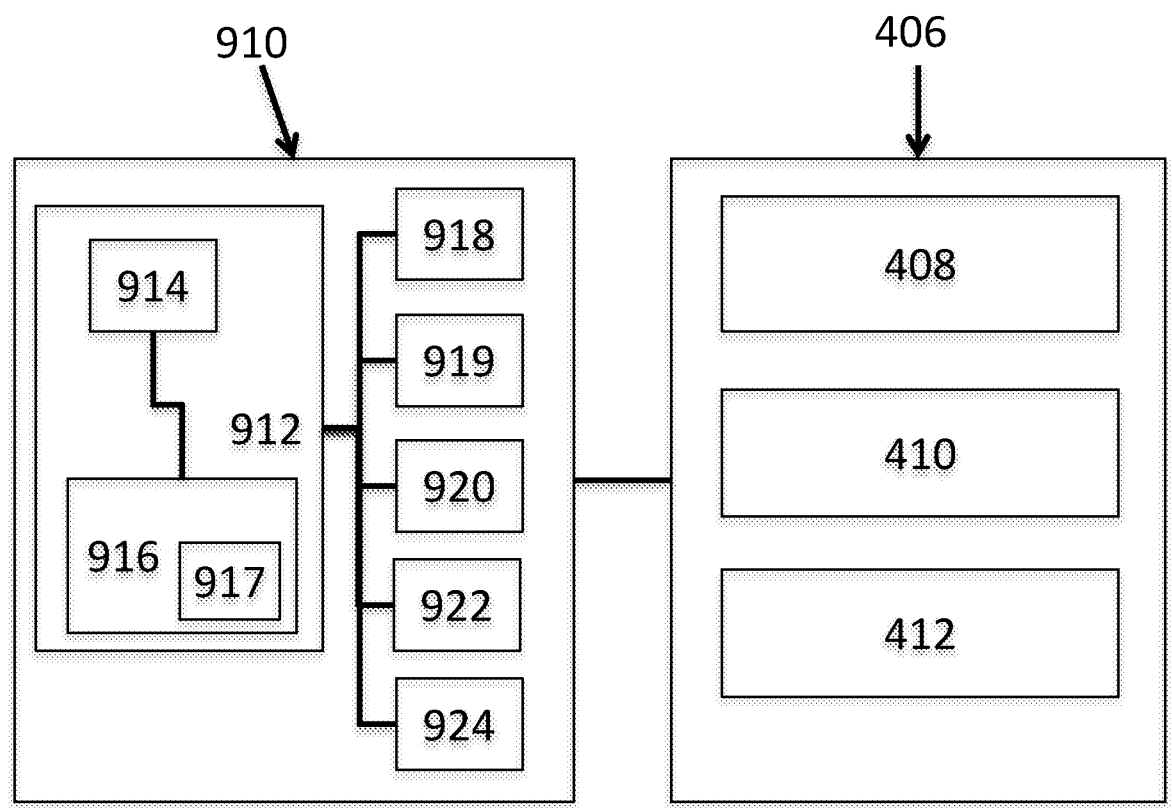
FIG. 9 shows processing and layup apparatus.

FIG. 9 shows a schematic diagram of control apparatus 910 and layup equipment 406 for carrying out the methods of designing a plybook for a composite component and optionally carrying out a layup procedure to layup the composite component. The control apparatus 910 includes a controller 912, a user input device 918, and an output device 919. In some examples, the apparatus 910 may be a module. As used herein, the wording 'module' refers to a device or apparatus where one or more features are included at a later time, and possibly, by another manufacturer or by an end user. For example, where the apparatus is a module, the apparatus may only include the controller, and the remaining features may be added by another manufacturer, or by an end user.

The controller 912, the user input device 918, and the output device 919 may be coupled to one another via a wireless link and may consequently comprise transceiver circuitry and one or more antennas. Additionally or alternatively, the controller 912 and the various other components of the control apparatus 910 including the user input device and the output device may be coupled to one another via a wired link and may consequently comprise interface circuitry (such as a Universal Serial Bus (USB) socket). It should be appreciated that the controller, the user input device, and the output device may be coupled to one another via any combination of wired and wireless links.

The controller 912 may comprise any suitable circuitry to cause performance of the methods described herein with reference to FIGS. 6-8. The controller 912 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

By way of an example, the controller may comprise at least one processor 914 and at least one memory 916. The memory 916 stores a computer program 917 comprising computer readable instructions that, when read by the processor, causes performance of the methods described herein with reference to FIGS. 6-8. The computer program 917 may be software or firmware, or may be a combination of software and firmware.

The processor 914 may include at least one microprocessor and may comprise a single core processor, may comprise multiple processor cores (such as a dual core processor or a quad core processor), or may comprise a plurality of processors (at least one of which may comprise multiple processor cores).

The memory 916 may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive).

The memory 916 also stores the component and material databases and the bond strength parameters.

The computer program 917 may be stored on a non-transitory computer readable storage medium. The computer program 917 may be transferred from the non-transitory computer readable storage medium to the memory 916. The non-transitory computer readable storage medium 916 may be, for example, a USB flash drive, a compact disc (CD), a digital versatile disc (DVD) or a Blu-ray disc. In some examples, the computer program 917 may be transferred to the memory 916 via a wireless signal or via a wired signal.

The user input device 918 may comprise any suitable device for enabling an operator to at least partially control the apparatus. For example, the user input device 918 may comprise one or more of a keyboard, a keypad, a touchpad, a touchscreen display, and a computer mouse. The controller 912 is configured to receive signals from the user input device.

The output device 919 may be any suitable device for conveying information to a user. For example, the output device may be a display (such as a liquid crystal display, or a light emitting diode display, or an active matrix organic light emitting diode display, or a thin film transistor display, or a cathode ray tube display), and/or a loudspeaker, and/or a printer (such as an inkjet printer or a laser printer). The controller 912 is arranged to provide a signal to the output device 919 to cause the output device to convey information to the user.

The control apparatus further comprises an input interface 920 for receiving data defining the component volume and an output interface 922 for providing plybook data to the layup equipment 406. The control apparatus 910 may be a computer.

The layup equipment 406 includes a further controller 412, an applicator head 408 and a tool 410. The controller 412 is configured to control the applicator head 408 and/or tool 410 for relative movement based on instructions received from the controller 412.

In other embodiments, there may only be the controller 912 of the control apparatus (i.e. there may be no controller 412), which may directly control the layup equipment 406.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A computer-implemented method of designing a plybook for a composite component, using a computer device comprising at least one memory and at least one processor, the method comprising:

defining, by the at least one processor, a component volume corresponding to the composite component to be manufactured;

defining, by the at least one processor, a plurality of successive cured plies of composite material to fill the component volume;

simulating, by the at least one processor, at least some of the plurality of successive cured plies of composite material based on an estimate of variable cured ply thickness generated by the at least one processor, wherein the variable cured ply thickness is estimated by:

simulating, by the at least one processor, at least a portion of a respective cured ply of composite material; and estimating, by the at least one processor, a cured ply thickness for the at least a portion of the respective cured ply of composite material at least partly based on local conditions of the at least a portion of the respective cured ply;

defining the plybook, by the at least one processor, based on the plurality of simulated successive cured plies; and transmitting, by the at least one processor, instructions to composite layup equipment to control the composite layup equipment to layup each ply defined in the plybook to form a pre-form for the composite component;

wherein the at least some of the plurality of successive cured plies of composite material are each simulated by defining a respective reference surface for the respective cured ply of composite material, and offsetting the respective reference surface by the cured ply thickness for the at least a portion of the respective cured ply.

2. A method according to claim 1, wherein the steps of defining and simulating each cured ply are conducted sequentially for each respective cured ply, such that a second cured ply of the plurality of successive cured plies is defined at least partly based on a simulated first cured ply of the plurality.

3. A method according to claim 1, wherein the component volume comprises a start surface and a target surface, wherein the plurality of successive cured plies are defined to fill the component volume successively from the start surface to the target surface; and wherein defining each cured ply of the plurality of successive cured plies further comprises:
  projecting the respective reference surface onto the target surface, by the at least one processor, to define an intersect boundary; and
  defining, by the at least one processor, a ply boundary for the respective cured ply based on the intersect boundary;
  wherein the intersect boundary is projected onto the respective reference surface for the respective cured ply or a corresponding surface of the respective cured ply to define the ply boundary.

4. A method according to claim 1,
  wherein the plurality of successive cured plies of composite material are a first plurality of successive cured plies defined to fill the component volume based on a first estimate of cured ply thickness;
  wherein the estimate of variable cured ply thickness is a second estimate of cured ply thickness;
  wherein the at least some of the first plurality of successive cured plies of composite material are simulated based on the second estimate of cured ply thickness to define an error volume; the method further comprising:
  defining, by the at least one processor, an error compensation volume based on the error volume and the component volume;
  defining, by the at least one processor, a second plurality of successive cured plies of composite material to fill the error compensation volume based on the first estimate of cured ply thickness; and
  wherein the plybook is defined based on the second plurality of simulated successive cured plies.

5. A method according to claim 1, wherein estimating the cured ply thickness for the at least a portion of the respective cured ply of composite material is at least partly based on one or more local conditions of the portion selected from the group consisting of:
  a position of the portion within the component volume;
  a position of the portion within the respective cured ply;
  a curvature of the portion as applied in the component volume; and
  a free volume local to the portion in the simulated component volume determined by simulating a presence of gaps and/or overlaps between tows and/or courses of composite material.

6. A method according to claim 5, wherein estimating the cured ply thickness for the at least a portion of the respective cured ply of composite material comprises:
  determining, by the at least one processor, the position of the portion within the component volume;
  estimating, by the at least one processor, the cured ply thickness for the portion as a function of a proximity of the portion to a boundary of the component volume.

7. A method according to claim 5, wherein estimating the cured ply thickness for the at least a portion of the respective cured ply of composite material comprises:
  determining, by the at least one processor, the position of the portion within the respective cured ply;
  estimating, by the at least one processor, the cured ply thickness for the portion as a function of a proximity of the portion to an edge of the cured ply.

8. A method according to any of claim 5, wherein estimating the cured ply thickness for the at least a portion of the respective cured ply of composite material comprises:
  determining, by the at least one processor, a metric of curvature associated with the portion;
  estimating, by the at least one processor, the cured ply thickness for the portion as a function of the curvature.

9. A method according to any of claim 5, wherein estimating the cured ply thickness for the at least a portion of the respective cured ply of composite material comprises:
  determining, by the at least one processor, a metric of free volume local to the portion in the simulated component volume by determining the presence of gaps and/or overlaps between tows and/or courses of composite material;
  estimating, by the at least one processor, the cured ply thickness based on the metric of free volume.

10. A method according to claim 9, further comprising determining, by the at least one processor, at least part of a head path for laying-up fibre composite material to form a pre-form for the simulated successive cured plies, and
  wherein the presence of gaps and/or overlaps between tows and/or courses of composite material is determined based on simulating tows and/or courses as applied in the component volume according to the head path.

11. A method according to claim 10, wherein the presence of gaps and/or overlaps between tows and/or courses of composite material is determined by analyzing a proximity between tows and/or courses as applied in the component volume according to the head path.

12. A method according to claim 1, wherein the plurality of successive cured plies of composite material are simulated using a discretized mesh.

13. A method according to claim 12, wherein the discretized mesh is progressively grown in layers as each of the successive cured plies of composite material is simulated.

14. A method according to claim 12, wherein a separate discretized mesh is defined for each simulated successive cured ply.

15. A method according to claim 12, wherein the variable cured ply thickness is estimated at nodes of the mesh.

16. A method according to claim 12, wherein a height of each mesh layer varies according to the estimated cured ply thickness.

17. A non-transitory computer-readable storage medium or computer program product comprising computer-readable instructions that, when read by a computer comprising at least one memory and at least one processor, causes the at least one processor to perform a method of designing a plybook for a composite component, comprising:
  defining, by the at least one processor, a component volume corresponding to the composite component to be manufactured;
  defining, by the at least one processor, a plurality of successive cured plies of composite material to fill the component volume;
  simulating, by the at least one processor, at least some of the plurality of successive cured plies of composite material based on an estimate of variable cured ply thickness, wherein the variable cured ply thickness is estimated by:

simulating, by the at least one processor, at least a portion of a respective cured ply of composite material; and estimating, by the at least one processor, a cured ply thickness for the at least a portion of the respective cured ply of composite material at least partly based on local conditions of the at least a portion of the respective cured ply;

defining, by the at least one processor, the plybook based on the plurality of simulated successive cured plies; and transmitting, by the at least one processor, instructions to composite layup equipment to control the composite layup equipment to layup fibre composite material defined in the plybook to form a pre-form for the composite component;

wherein the at least some of the plurality of successive cured plies of composite material are each simulated by defining a respective reference surface for the respective cured ply of composite material, and offsetting the respective reference surface by the cured ply thickness for the at least a portion of the respective cured ply.

18. A computer apparatus comprising:

at least one processor;

at least one memory comprising computer-readable instructions;

the at least one processor being configured to read the computer readable instructions, wherein the instructions are configured to cause the at least one processor to perform a method of designing a plybook for a composite component, comprising:

defining, by the at least one processor, a component volume corresponding to the composite component to be manufactured;

defining, by the at least one processor, a plurality of successive cured plies of composite material to fill the component volume;

simulating, by the at least one processor, at least some of the plurality of successive cured plies of composite material based on an estimate of variable cured ply thickness, wherein the variable cured ply thickness is estimated by:

simulating, by the at least one processor, at least a portion of a respective cured ply of composite material; and estimating, by the at least one processor, a cured ply thickness for the at least a portion of the respective cured ply of composite material at least partly based on local conditions of the at least a portion of the respective cured ply;

defining, by the at least one processor, the plybook based on the plurality of simulated successive cured plies; and transmitting, by the at least one processor, instructions to composite layup equipment to control the composite layup equipment to layup each ply defined in the plybook to form a pre-form for the composite component;

wherein the at least some of the plurality of successive cured plies of composite material are each simulated by defining a respective reference surface for the respective cured ply of composite material, and offsetting the respective reference surface by the cured ply thickness for the at least a portion of the respective cured ply.

19. A computer-implemented method of designing a plybook for a composite component, comprising:

defining a component volume corresponding to the composite component to be manufactured;

defining a plurality of successive cured plies of composite material to fill the component volume;

simulating at least some of the plurality of successive cured plies of composite material based on an estimate of variable cured ply thickness, wherein the variable cured ply thickness is estimated by:

simulating at least a portion of a respective cured ply of composite material; and estimating a cured ply thickness for the at least a portion of the respective cured ply of composite material at least partly based on local conditions of the at least a portion of the respective cured ply;

defining the plybook based on the plurality of simulated successive cured plies; and controlling composite layup equipment to layup each ply defined in the plybook to form a pre-form for the composite component;

wherein the at least some of the plurality of successive cured plies of composite material are each simulated by defining a respective reference surface for the respective cured ply of composite material, and offsetting the respective reference surface by the cured ply thickness for the at least a portion of the respective cured ply.

* * * * *